US008497874B2

(12) United States Patent
Ramchandani et al.

(10) Patent No.: US 8,497,874 B2
(45) Date of Patent: *Jul. 30, 2013

(54) PIXEL SNAPPING FOR ANTI-ALIASED RENDERING

(75) Inventors: Seema L. Ramchandani, Seattle, WA (US); David C. Brown, Basingstoke (GB); Mikhail M. Lyapunov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1310 days.

This patent is subject to a terminal disclaimer.

(21) Appl. No.: 11/497,170

(22) Filed: Aug. 1, 2006

(65) Prior Publication Data

US 2008/0030525 A1 Feb. 7, 2008

(51) Int. Cl.
*G09G 5/00* (2006.01)
(52) U.S. Cl.
USPC .......................................... 345/611; 345/651
(58) Field of Classification Search
USPC ................................................. 345/611, 651
See application file for complete search history.

(56) References Cited

U.S. PATENT DOCUMENTS

| | | | |
|---|---|---|---|
| 5,179,638 A | 1/1993 | Dawson et al. | |
| 5,237,647 A | 8/1993 | Roberts et al. | |
| 5,261,030 A | 11/1993 | Brooke | |
| 5,459,828 A * | 10/1995 | Zack et al. | 345/472 |
| 5,519,822 A | 5/1996 | Barkans et al. | |
| 5,588,108 A | 12/1996 | Kumar et al. | |
| 5,719,595 A | 2/1998 | Hoddie et al. | |
| 5,798,752 A | 8/1998 | Buxton et al. | |
| 5,838,317 A | 11/1998 | Bolnick et al. | |
| 5,872,902 A | 2/1999 | Kuchkuda et al. | |
| 5,956,157 A | 9/1999 | Tai | |
| 6,101,514 A * | 8/2000 | Chan | 715/232 |
| 6,141,034 A | 10/2000 | McCutchen | |
| 6,377,240 B1 * | 4/2002 | Baudel et al. | 345/157 |
| 6,377,262 B1 * | 4/2002 | Hitchcock et al. | 345/467 |
| 6,600,490 B1 | 7/2003 | Brock et al. | |
| 6,636,235 B1 | 10/2003 | Cooper et al. | |
| 6,654,020 B2 | 11/2003 | Mori | |
| 6,681,053 B1 | 1/2004 | Zhu | |
| 6,812,933 B1 | 11/2004 | Silver | |
| 6,956,576 B1 | 10/2005 | Deering et al. | |
| 7,123,780 B2 * | 10/2006 | Carrig | 382/299 |
| 7,287,241 B2 | 10/2007 | Balsiger | |
| 7,502,034 B2 | 3/2009 | Chemel et al. | |

(Continued)

OTHER PUBLICATIONS

Huang, et al., "FastSplats: Optimized Splatting on Rectilinear Grids", Proceedings Visualization, 2000, 9 Pages.

(Continued)

*Primary Examiner* — Maurice L McDowell, Jr.

(57) ABSTRACT

Various technologies and techniques are disclosed for improving output rendering in anti-aliased rendering scenarios. The system receives information regarding at least one visual element area which is important for symmetric appearance. The information can include at least one coordinate of a guideline that a client would like to be snapped towards a pixel grid. The system uses the information to perform a pixel snapping procedure to snap the points of visual element to a pixel grid to create an adjusted image. The adjusted image is rendered on a display device in an anti-aliased rendering scenario. APIs are provided for setting horizontal and vertical pixel snapping guidelines. The collections containing the snapping guidelines are accessed and used during the pixel snapping procedure.

20 Claims, 9 Drawing Sheets

U.S. PATENT DOCUMENTS

| | | |
|---|---|---|
| 2002/0004755 A1 | 1/2002 | Balthaser |
| 2003/0160805 A1 | 8/2003 | Toji et al. |
| 2004/0046769 A1* | 3/2004 | Arvin et al. .................... 345/619 |
| 2004/0056906 A1* | 3/2004 | Arvin ............................ 345/861 |
| 2004/0257619 A1 | 12/2004 | Loce et al. |
| 2004/0261012 A1 | 12/2004 | Balsiger |
| 2005/0088452 A1 | 4/2005 | Hanggie et al. |
| 2005/0218237 A1 | 10/2005 | Lapstun et al. |
| 2005/0275660 A1 | 12/2005 | Keller |
| 2008/0030525 A1 | 2/2008 | Ramchandani et al. |

OTHER PUBLICATIONS

Hasinoff, et al., "Boundary Matting for View Synthesis", Dept. of Computer Science. University of Toronto, Oct. 26, 2005, pp. 1-21.

"Glide 3.0 Reference Manual", Programming the 3Dfx Interactive Glide™ Rasterization Library 3.0, Document Release 020, Jul. 23, 1998, 203 Pages.

* cited by examiner

PIXEL SNAPPING FOR ANTI-ALIASED RENDERING

BACKGROUND

Anti-aliasing is a technique that is used to make graphics and text easier to read and pleasing to the eye when viewed on a computer screen. Anti-aliasing is a way of getting around the low dots per inch (DPI) resolution of the computer screen (such as 72 DPI). Anti-aliased rendering affects pixels on the edges of a rendered figure. It calculates the percentage of pixel area covered by the figure and composes a color value as a mixture of figure color and background color. Anti-aliasing cannot improve the physical resolution of a display (e.g. an anti-aliased image on 72 DPI display will never be as crisp as on 1200 DPI), but anti-aliasing minimizes the difference between ideal and generated images and thus improves quality. In particular, anti-aliasing suppresses so-called "saw teeth" edges that used to appear on tilted figure edges without anti-aliasing.

One problem with anti-aliasing, however, is that it can produce irregular soft and sharp rendering of an image on the screen, depending on the location of edges. For example, an edge that falls exactly between screen pixels appears sharp, but an edge that falls in the middle of a screen pixel appears soft. This problem is implicitly created by device independent layout calculations. When device resolution is known, layout calculations can place edges exactly onto the boundaries between pixel rows and columns. Device independency assumes the resolution is not known so edges will either coincide with the pixel grid or take some fraction of a pixel row. For example, a vertical black line that is one pixel wide can appear as a column of black pixels while another similar line can appear as two columns of grey pixels, due to half pixel offset.

An additional problem that can occur when using anti-aliasing is seeping. Seeping occurs when two abutting objects have a common edge that is not aligned between a row or column of device pixels. The first rendered object fills the pixels on the edge with a mixture of background and foreground color. The second object will take these pixels as its background and in turn mix it with a second foreground color so that the initial background penetrates into the resulting color values. Seeping is especially unpleasant when objects have the same solid foreground color and are supposed to appear as a single shape, while anti-aliased rendering leaves undesired seams that remain visible even on high DPI devices.

SUMMARY

Various technologies and techniques are disclosed for improving output rendering in anti-aliased rendering scenarios. The system receives information regarding at least one visual element area which is important for symmetric appearance. The information can include at least one coordinate of a guideline that a client would like to be snapped towards on a pixel grid. The system uses the information to perform a pixel snapping procedure to snap the points of visual element to a pixel grid to create an adjusted image. The adjusted point coordinates are then used for rendering the visual element on a display device in an anti-aliased rendering scenario.

APIs are provided for setting horizontal and vertical pixel snapping guidelines. The collections containing the snapping guidelines are accessed and used during the pixel snapping procedure. The guidelines are used to calculate offsets that are used to determine translation values for visual element points. In one implementation, the pixel snapping procedure improves a rendering appearance of the outputted image.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
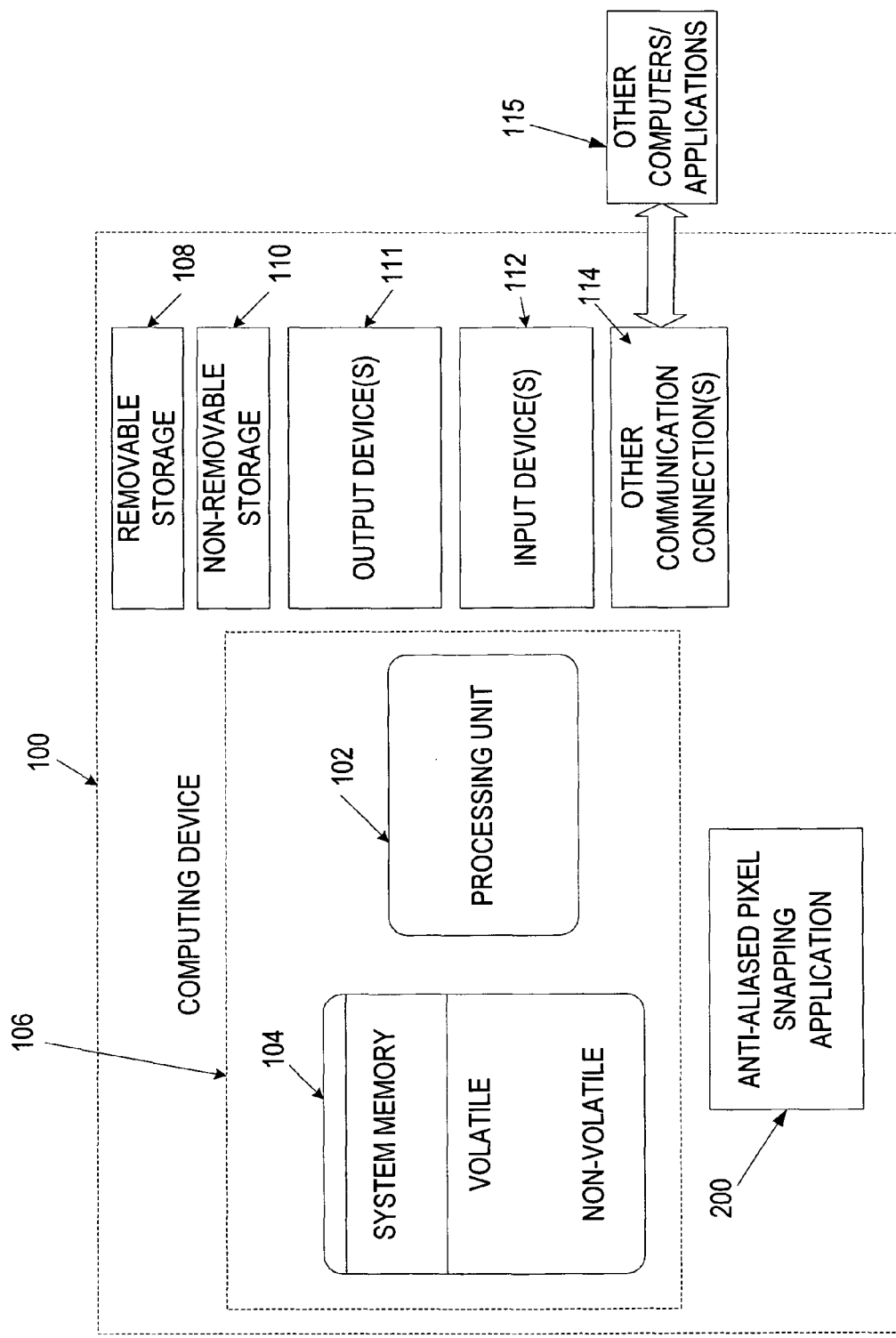
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a pixel snapping application for anti-aliased rendering situations, but the system also serves other purposes in addition to these. In one implementation, one or more of the techniques described herein can be implemented as features within an operating system program such as MICROSOFT® WINDOWS®, or from any other type of program or service that is responsible for analyzing and/or outputting graphical elements for display on a display device. In another implementation, one or more of the techniques described herein are implemented as features with other applications that deal with improving the rendering of output to a display device for viewing by a user.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display device, speakers, printer, etc. may also be included. These devices are well known in the art and need not be discussed at length here. In one implementation, computing device 100 includes anti-aliased pixel snapping application 200, which will be described in further detail in FIG. 2.

Figure 2:
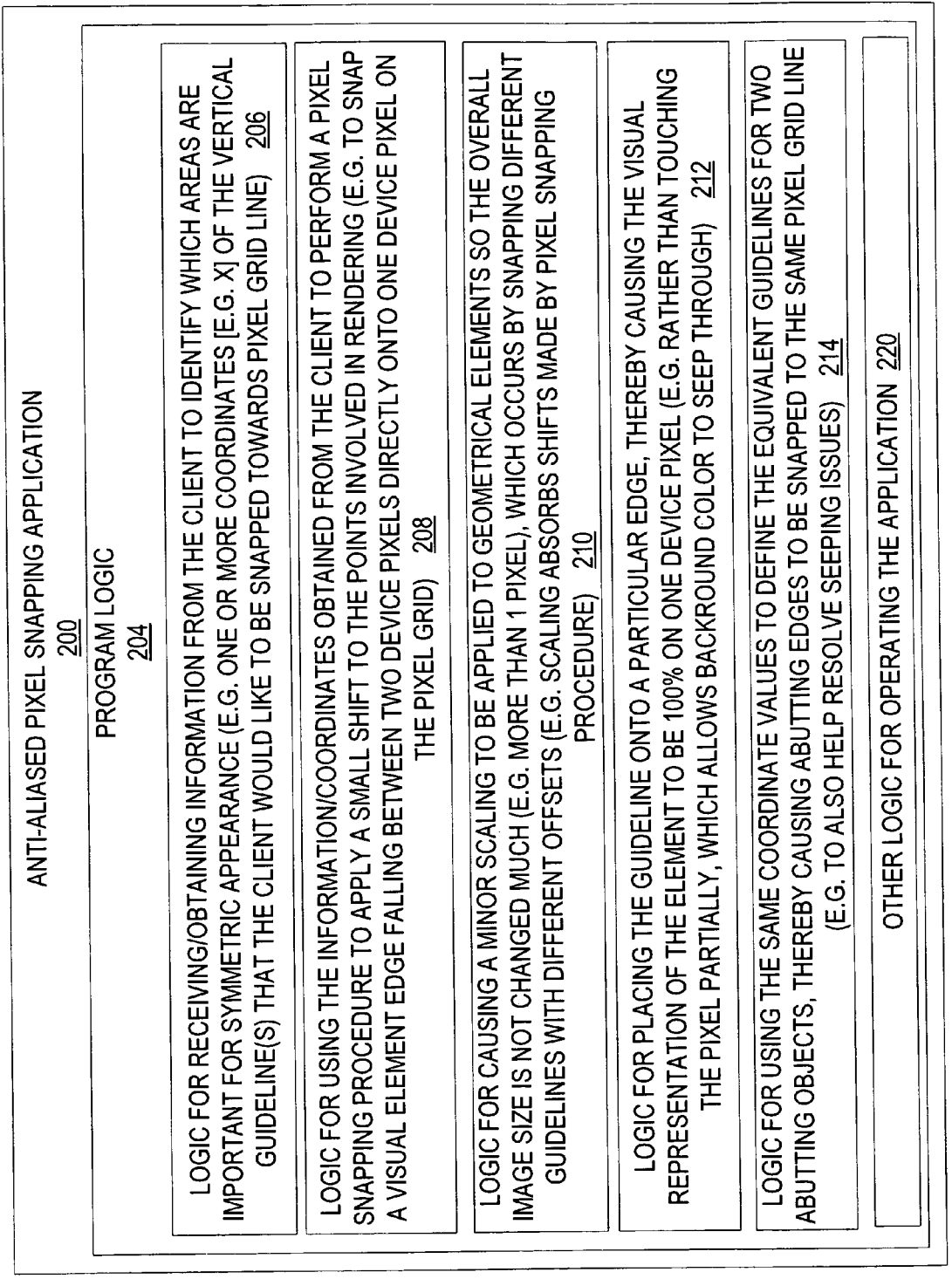
FIG. 2 is a diagrammatic view of an anti-aliased pixel snapping application of one implementation operating on the computer system of FIG. 1.

Turning now to FIG. 2 with continued reference to FIG. 1, an anti-aliased pixel snapping application 200 operating on computing device 100 is illustrated. Anti-aliased pixel snapping application 200 is one of the application programs that reside on computing device 100. Alternatively or additionally, one or more parts of anti-aliased pixel snapping application 200 can be part of system memory 104, on other computers and/or applications 115, or other such variations as would occur to one in the computer software art.

Anti-aliased pixel snapping application 200 includes program logic 204, which is responsible for carrying out some or all of the techniques described herein. Program logic 204 includes logic for receiving/obtaining information from the client to identify which areas are important for symmetric appearance (e.g. one or more coordinates [e.g. X] of the vertical guideline(s) that the client would like to be snapped towards the pixel grid line) 206; logic for using the information/coordinates obtained from the client to perform a pixel snapping procedure to apply a small shift to the points involved into rendering procedure (e.g. snap an edge of a visual element falling between two device pixels directly onto one device pixel on the pixel grid) 208; logic for causing a minor scaling to be applied to geometrical elements so the overall image size is not changed much (e.g. more than 1 pixel), which occurs by snapping different guidelines with different offsets (e.g. scaling absorbs shifts made by pixel snapping procedure). 210; logic for placing the guideline onto a particular edge, thereby causing the visual representation of the element to be 100% on one device pixel (e.g. rather than touching that pixel partially, which allows background color to seep through) 212; logic for using the same coordinate values to define equivalent guidelines for two abutting objects, thereby causing abutting edges to be snapped to the same pixel grid line (e.g. to also help resolve seeping issues) 214; and other logic for operating the application 220. In one implementation, program logic 204 is operable to be called programmatically from another program, such as using a single call to a procedure in program logic 204.

Figure 3:
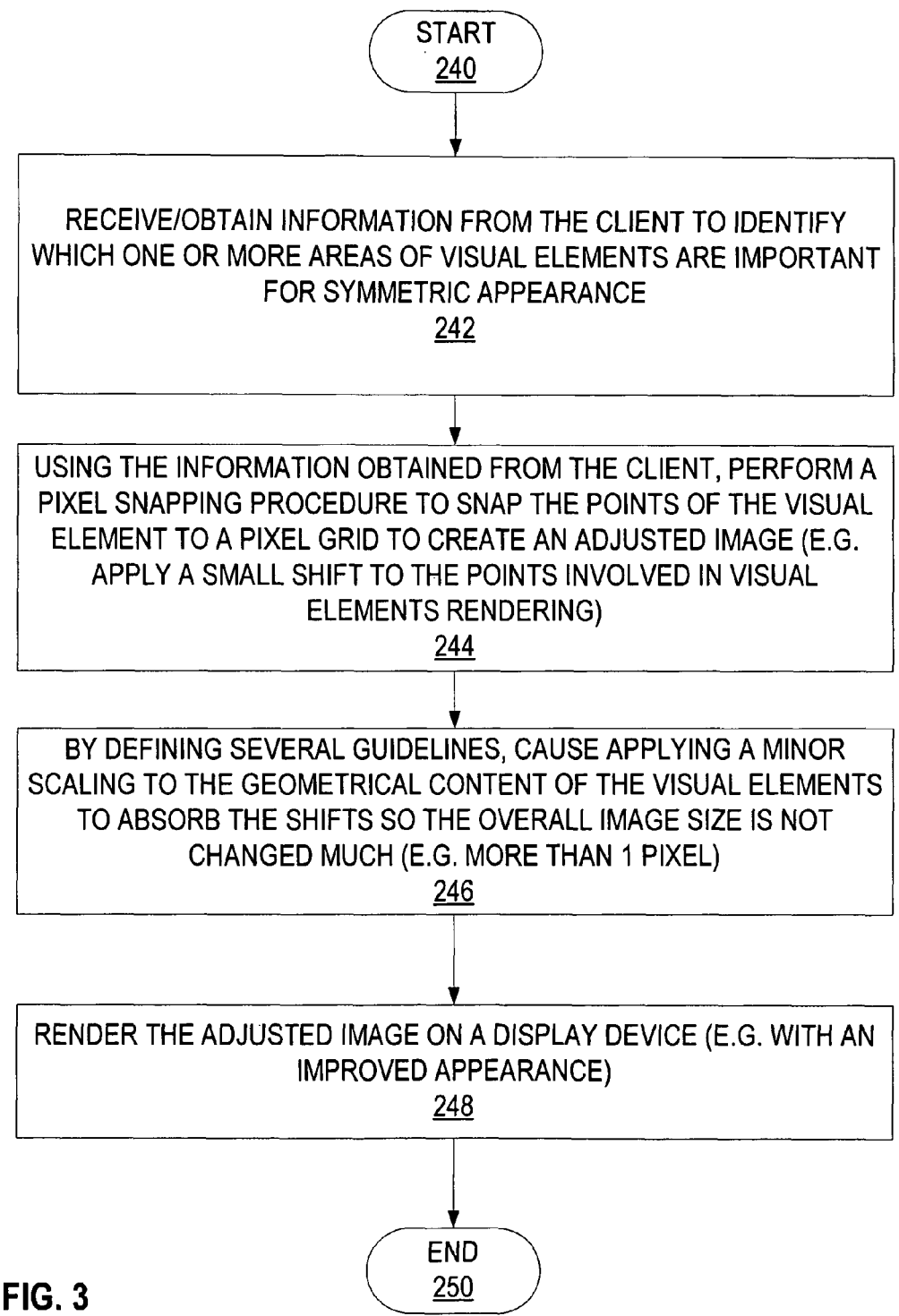
FIG. 3 is a high-level process flow diagram for one implementation of the system of FIG. 1.

Turning now to FIGS. 3-6 with continued reference to FIGS. 1-2, the stages for implementing one or more implementations of anti-aliased pixel snapping application 200 are described in further detail. FIG. 3 is a high level process flow diagram for one implementation of anti-aliased pixel snapping application 200. In one form, the procedure of FIG. 3 is at least partially implemented in the operating logic of computing device 100.

The procedure begins at start point 240 with receiving/obtaining information from the client to identify the visual elements (e.g. which one or more areas are important for symmetric appearance) and the horizontal/vertical guidelines; the guidelines are used to align the elements in the appropriate (horizontal or vertical) orientation (stage 242). The term guideline as used herein refers to a user-defined line utilized as a guide by which the system uses to position the visual element for the purpose of having the edges coincide with device pixels.

Using the information obtained from the client, the system performs a pixel snapping procedure to snap the points of the visual element to a pixel grid to create an adjusted image (e.g. to apply a small shift to the points involved in visual elements rendering) (stage 244). By defining several guidelines, cause a minor scaling to the geometrical content of the visual elements to absorb the shifts so the overall image size is not changed much (e.g. more than one pixel) (stage 246). The adjusted image is rendered on a display device (e.g. with an improved appearance as a result of the pixel snapping) (stage 248). The procedure ends at point 250.

Figure 4:
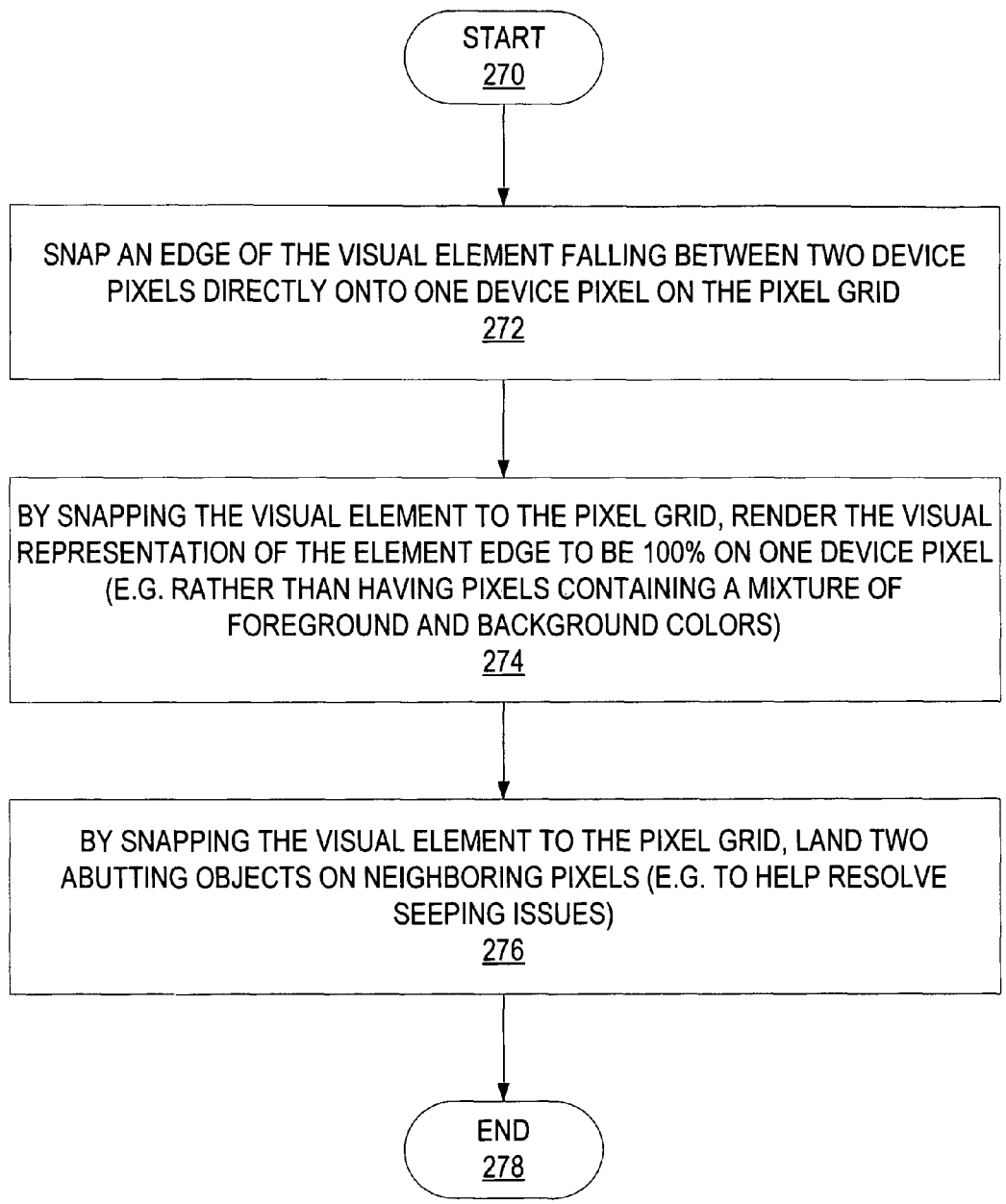
FIG. 4 is a process flow diagram for one implementation of the system of FIG. 1 illustrating the high level stages involved in snapping a visual element to a pixel grid.

Turning now to FIG. 4, a process flow diagram for one implementation of the system of FIG. 1 illustrating the high level stages involved in snapping a visual element to a pixel grid is shown. In one form, the procedure of FIG. 4 is at least partially implemented in the operating logic of computing device 100. The procedure begins at start point 270 with snapping a horizontal or vertical edge of the visual element falling between two device pixels directly onto one device pixel on the pixel grid (stage 272). By snapping the edge of the visual element to the pixel grid, the system renders the edge of the visual representation of the element to be 100% on one device pixel (e.g. rather than having pixels containing a mixture of foreground and background colors) (stage 274). Alternatively or additionally, by snapping the horizontal and vertical edges of the visual element to the pixel grid, two abutting objects are landed on neighboring pixels (e.g. to help resolve seeping issues) (stage 276). The procedure ends at end point 278.

Figure 5:
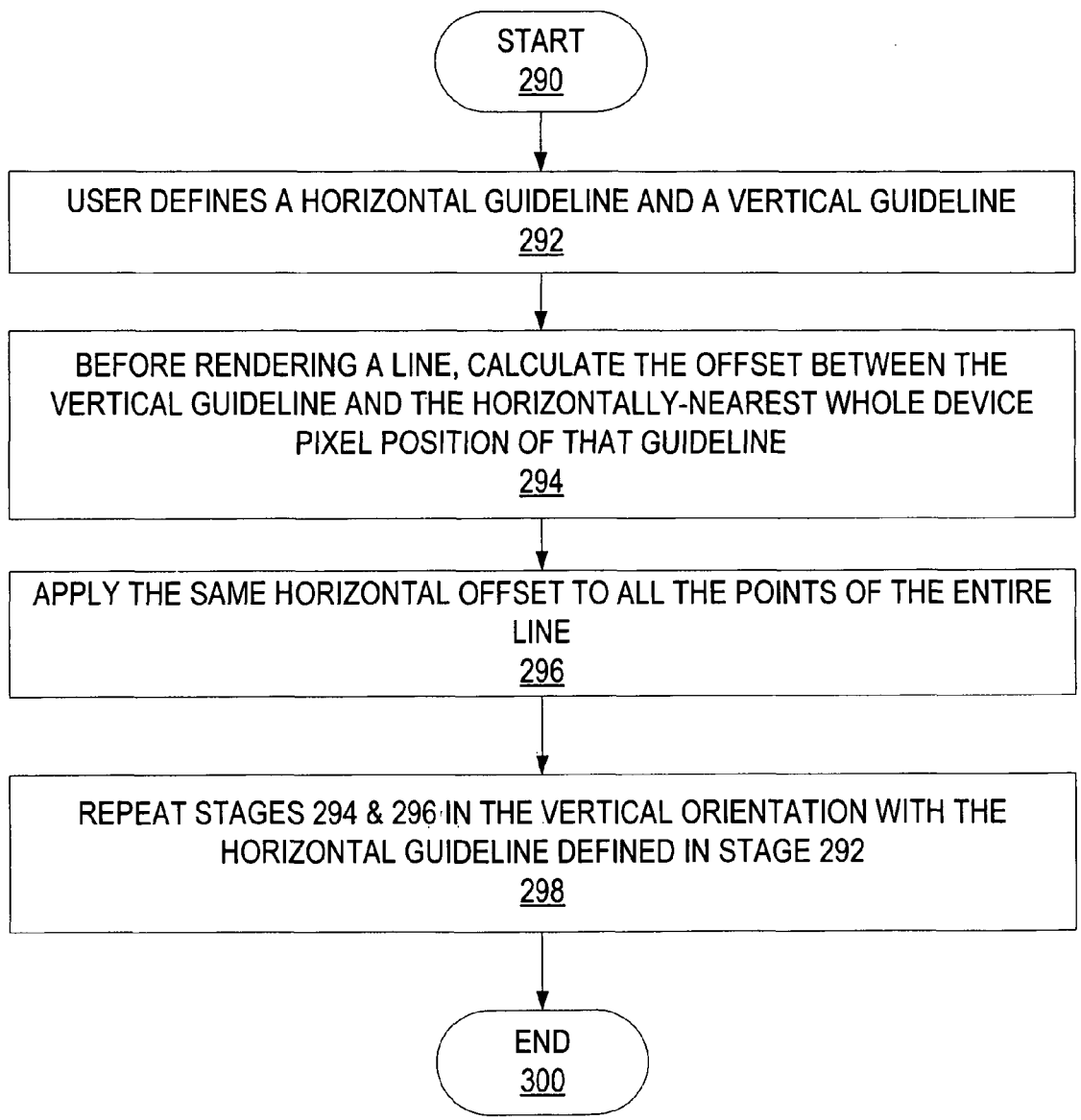
FIG. 5 is a process flow diagram for one implementation of the system of FIG. 1 illustrating the more detailed stages involved in snapping a horizontal visual line to a pixel grid.

FIG. 5 is a process flow diagram for one implementation of the system of FIG. 1 illustrating the more detailed stages involved in snapping a visual element to a pixel grid. In one form, the procedure of FIG. 5 is at least partially implemented in the operating logic of computing device 100. The procedure begins at start point 290 with the user defining a horizontal guideline and a vertical guideline (stage 292). Before rendering a line, the system calculates the offset between the vertical guideline and the horizontally-nearest whole pixel position of that guideline (stage 294). The same horizontal offset is applied to all points of the entire line (stage 296). The system repeats stages 294 and 296 in the vertical orientation with the horizontal guideline (stage 298). In one implementation, the points between two snapping guidelines are adjusted in proportion to the adjustment made to points on the guidelines, so that straight diagonal lines between snapping gridlines remain straight. The procedure then ends at end point 300.

Figure 6:
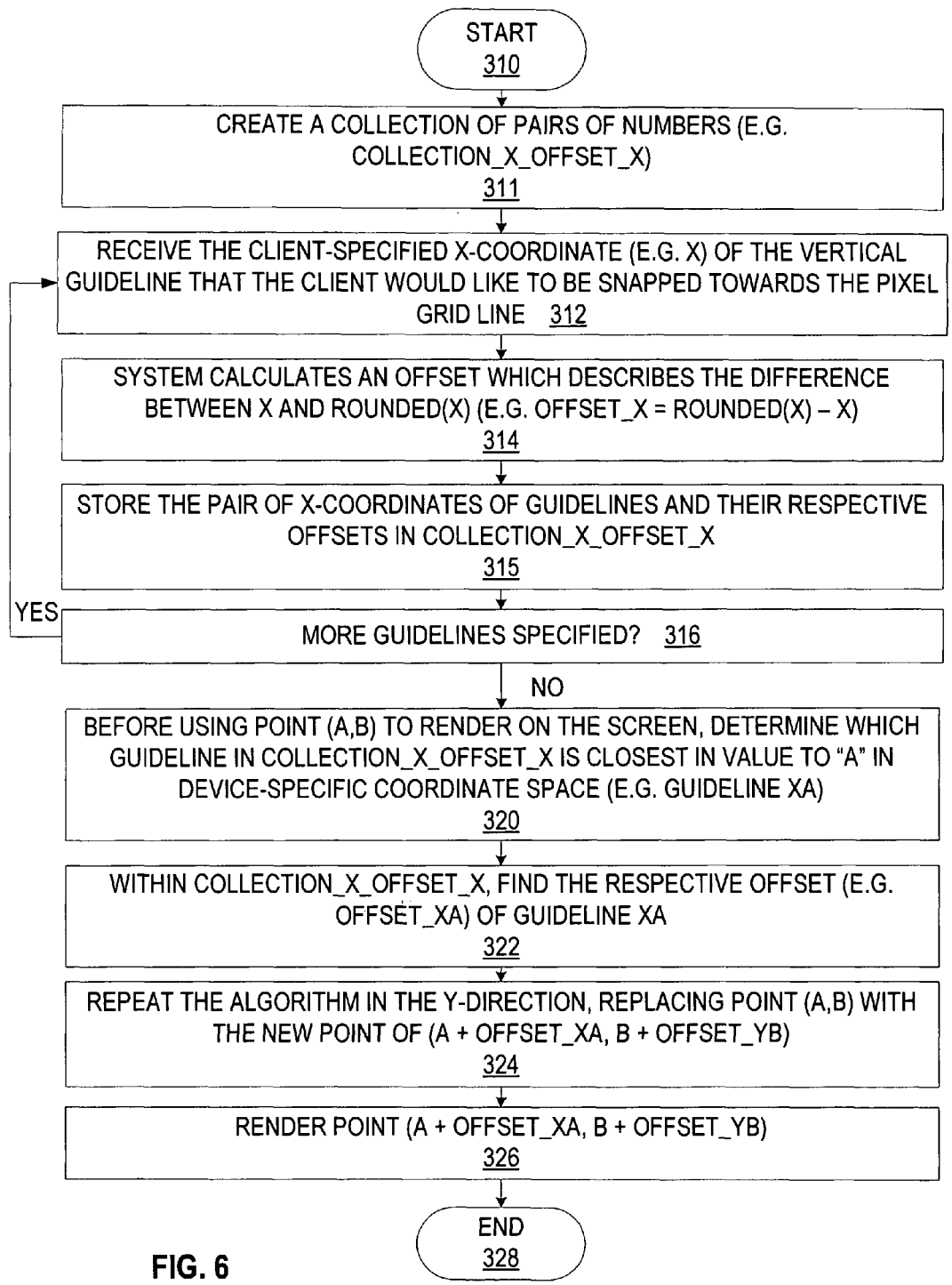
FIG. 6 is a process flow diagram for one implementation of the system of FIG. 1 illustrating the stages involved in using guidelines and offsets in a pixel snapping procedure to snap a visual element to a pixel grid.

FIG. 6 is a process flow diagram for one implementation of the system of FIG. 1 illustrating the stages involved in using guidelines and offsets in a pixel snapping procedure to snap a visual element to a pixel grid. In one form, the procedure of FIG. 6 is at least partially implemented in the operating logic of computing device 100. The procedure starts at start point 310 with creating a collection of pairs of numbers (e.g. Collection_X_Offset_X) (stage 311). The system receives the client-specified X-coordinate (e.g. X) of the vertical guideline that the client would like to be snapped towards pixel grid line (stage 312). The system calculates an offset which describes the difference between X and Rounded(X) (e.g. Offset_X=Rounded(X)−X) (stage 314). The system stores the pair of X-coordinates of guidelines and their respective offsets in Collection_X_Offset_X (stage 315). If more guidelines are specified (decision point 316), then stages 310 and 312 are repeated. Before using the point (A,B) in rendering, the system determines which guideline in Collection_X_Offset_X is closest in value to "A" in device-specific coordinate space (e.g. Guideline XA) (stage 320). Within Collection_X_Offset_X, the system finds the respective offset (e.g. Offset_XA) of guideline XA (stage 322). The algorithm is repeated in the Y-direction (e.g. stages 320 and 322), replacing point (A,B) with the new point of (A+Offset_XA, B+Offset_YB) (stage 324). The system renders the point (A+Offset_XA, B+Offset_YB) on a display device (stage 326). The procedure ends at end point 328.

Figure 7:
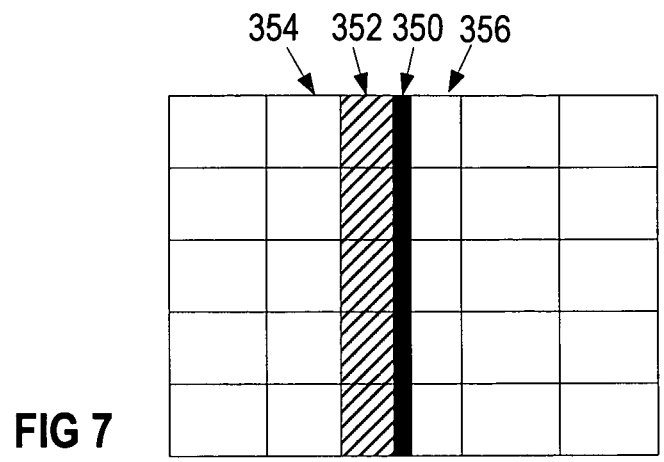
FIG. 7 is a geometrical diagram for one implementation of the system of FIG. 1 that illustrates applying a guideline to a pixel grid.
Figure 8:
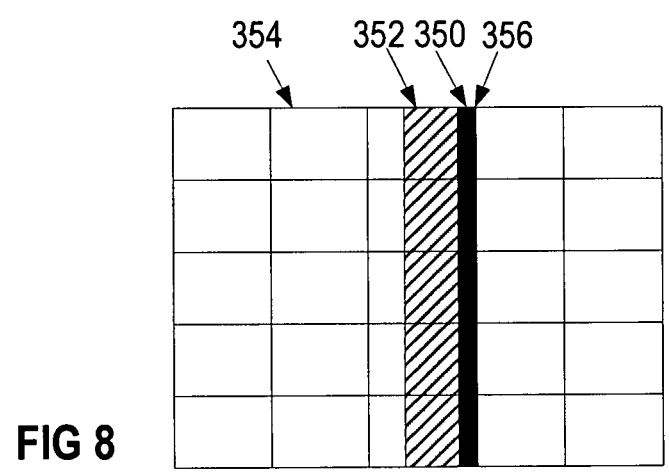
FIG. 8 is a geometrical diagram for one implementation of the system of FIG. 1 that illustrates snapping the guideline and line to the nearest whole pixel.
Figure 9:
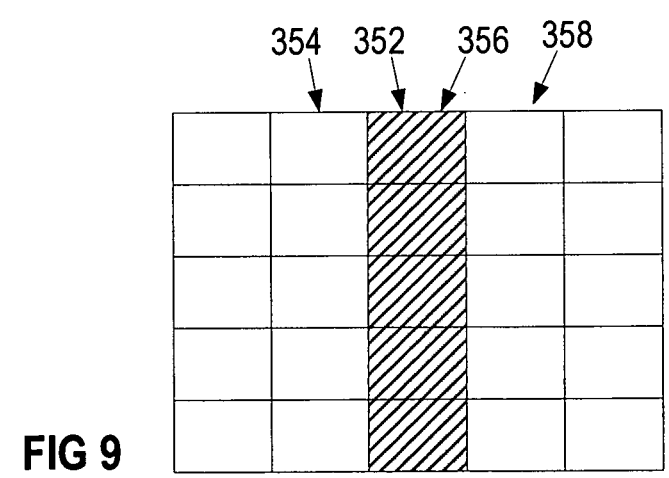
FIG. 9 is a geometrical diagram for one implementation of the system of FIG. 1 that illustrates rendering the adjusted line after performing the pixel snapping procedure.

Turning now to FIGS. 7-9, geometrical diagrams will be shown to graphically illustrate the pixel snapping procedure described in FIGS. 3-6. The same reference numerals will be used to represent the same elements on FIGS. 7-9. FIG. 7 is a geometrical diagram for one implementation of the system of FIG. 1 that illustrates applying a guideline 350 to a pixel grid. Guideline 350 is displayed adjacent to the line 352 which is to be rendered on the display device. Line 352 is currently located between two different device pixels (354 and 356, respectively).

FIG. 8 is a geometrical diagram for one implementation of the system of FIG. 1 that illustrates snapping the guideline 350 and line 352 to the nearest whole pixel 356 using the pixel snapping procedure described in FIGS. 3-6. After snapping guideline 350 to pixel 356, guideline 350 and line 352 no longer cross over pixel 354. FIG. 9 illustrates one implementation of rendering the adjusted line after performing the pixel snapping procedure. Line 352 now spans the entire pixel 356, and is located evenly between pixels 354 and 358.

Figure 10:
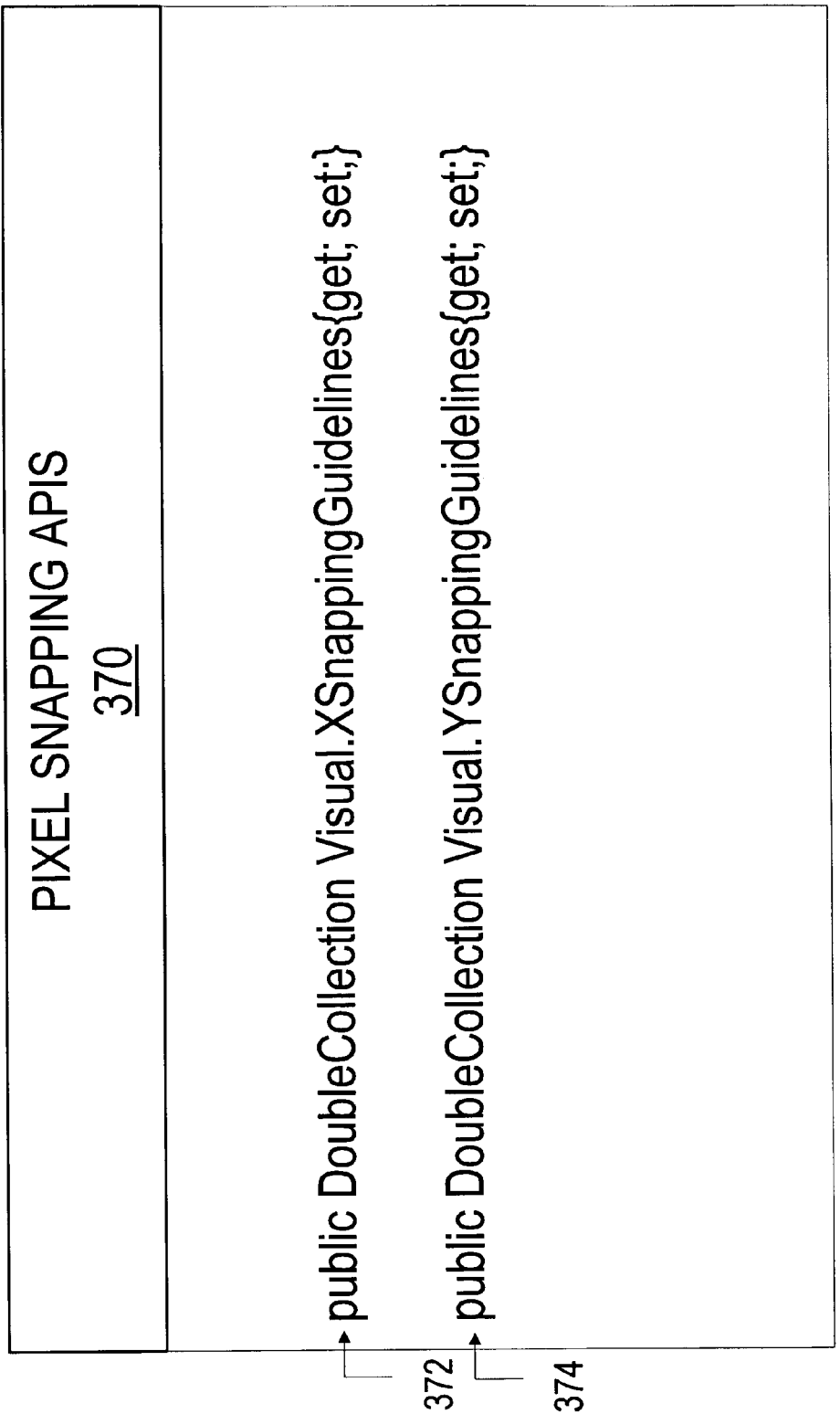
FIG. 10 is a class diagram for one implementation of the system of FIG. 1 that illustrates two pixel snapping APIs.

FIG. 10 is a class diagram for one implementation of the system of FIG. 1 that illustrates pixel snapping APIs 370. An API called XSnappingGuidelines 372 and an API called YSnappingGuidelines 374 are shown. These APIs allow for setting a collection of horizontal pixel snapping guidelines on a visual in anti-aliased rendering scenarios. In one implementation, setting a new X or Y guidelines collection replaces any existing collection. The collection may be cleared by setting an empty collection. In another implementation, the collection of guidelines applies to a single visual. Guidelines are inherited by lower level visuals in the tree. In the case that a lower level defines its own guideline set, the parent's guideline set is ignored. The operation of these APIs is described in further detail in FIG. 11.

Figure 11:
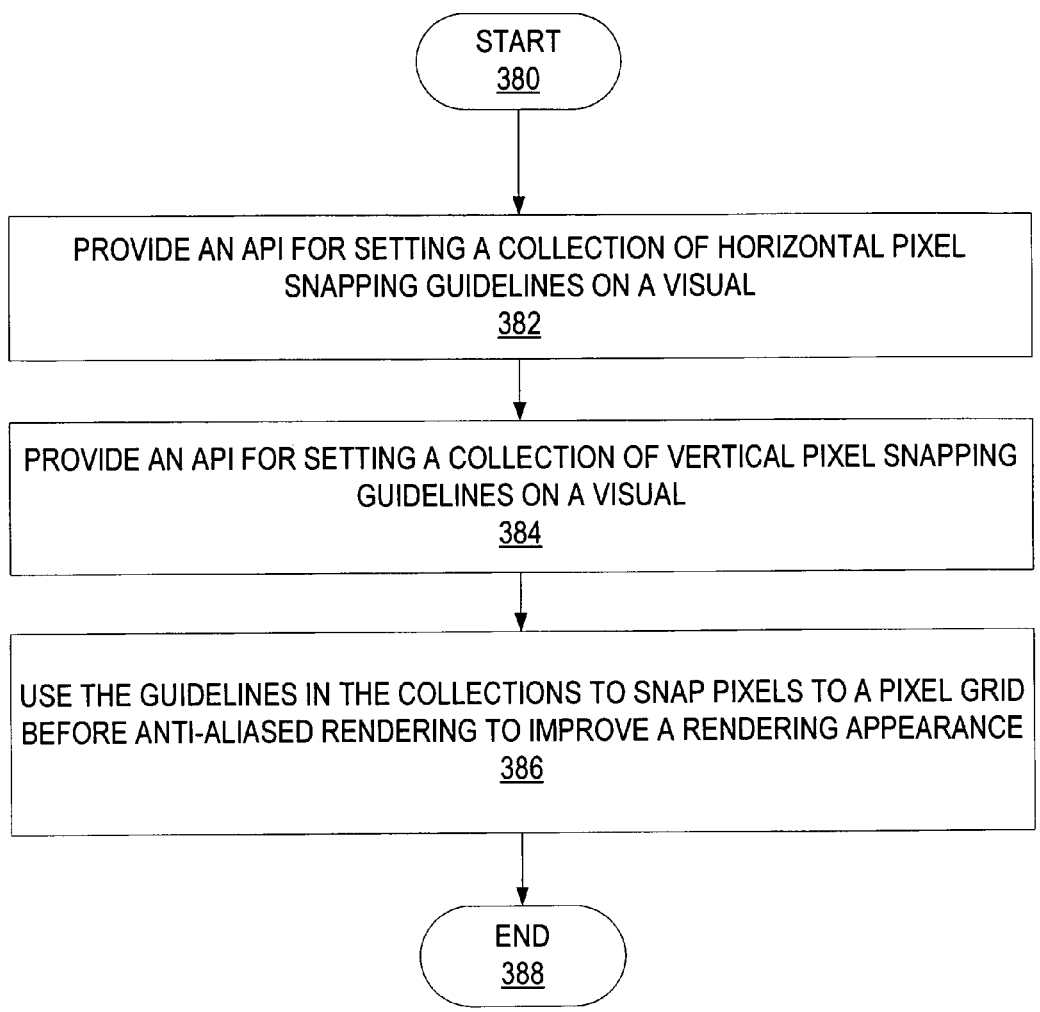
FIG. 11 is a process flow diagram for one implementation of the system of FIG. 1 illustrating the stages involved in using the pixel snapping APIs of FIG. 10 to snap pixels to a pixel grid before anti-aliased rendering.

In FIG. 11, a process flow diagram is shown for one implementation illustrating the stages involved in using the pixel snapping APIs of FIG. 10 to snap pixels to a pixel grid before anti-aliased rendering. In one form, the procedure of FIG. 11 is at least partially implemented in the operating logic of computing device 100. The procedure starts at start point 380 with providing an API for setting a collection of horizontal pixel snapping guidelines on a visual (stage 382). An API is provided for setting a collection of vertical pixel snapping guidelines on a visual (stage 384). The system uses the guidelines in the collections to snap pixels to a pixel grid before anti-aliased rendering to improve a rendering appearance (stage 386). The procedure ends at end point 388.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for snapping points of a visual element defined in accordance with a device-independent coordinate system to a device-dependent pixel grid to improve an anti-aliased rendering comprising the steps of:

receiving a plurality of guidelines associated with the visual element, wherein each of the plurality of guidelines is defined in accordance with the device-independent coordinate system and is associated with an area of symmetry of the visual element;

determining an offset required to align each of the guidelines with a nearest line in the pixel grid and storing each offset in association with its corresponding guideline in memory;

snapping the points of the visual element to the pixel grid to create an adjusted image by accessing the memory to determine which guideline is closest to each of the points and then applying to each point the offset associated with the guideline that is closest thereto; and rendering the adjusted image on a display device.

2. The method of claim 1, wherein each guideline includes one or more coordinates.

3. The method of claim 2, wherein the one or more coordinates includes an x-coordinate for a vertical line.

4. The method of claim 1, wherein each guideline is received from a client.

5. The method of claim 1, wherein each guideline is contained in a vertical pixel snapping guideline collection or a horizontal pixel snapping guideline collection.

6. The method of claim 1, wherein determining the offset comprises calculating a horizontal offset between each guideline and a horizontally-nearest whole pixel position of the guideline.

7. The method of claim 1, wherein determining the offset comprises calculating a vertical offset between each guideline and a vertically-nearest whole pixel position of the guideline.

8. The method of claim 1, wherein the adjusted image has an improved appearance.

9. The method of claim 1, wherein snapping the points of the visual element to the pixel grid to create an adjusted image comprises snapping the points of a visual element falling between two device pixels directly onto one device pixel on the pixel grid.

10. The method of claim 1, wherein snapping the points of the visual element to the pixel grid to create an adjusted image comprises moving a point of the visual element entirely onto one device pixel.

11. The method of claim 1, wherein by snapping the points of the visual element to the pixel grid to create an adjusted image, two abutting objects are landed onto neighboring pixels.

12. A storage device having computer-executable instructions for causing a computer to perform the steps recited in claim 1.

13. A storage device having computer-executable instructions for causing a computer to perform steps comprising:
receiving a plurality of guidelines associated with a visual element, wherein each guideline is defined by a coordinate of a device-independent coordinate system and is associated with an area of symmetry of at least a portion of the visual element;
determining an offset required to align each guideline with a nearest line of a device-dependent pixel grid;
storing each guideline in association with the offset determined therefor in a memory; and
applying a shift to a point of the visual element defined in accordance with the device-independent coordinate system during rendering, wherein applying the shift comprises accessing the memory to determine which of the guidelines is nearest to the point and then applying the offset associated with the guideline to the point.

14. The storage device of claim 13, further comprising computer-executable instructions for causing the computer to perform scaling to absorb a plurality of shifts made during rendering.

15. The storage device of claim 13, wherein applying the shift to the point of the visual element during rendering comprises snapping a point of a visual element edge falling between two device pixels directly onto one device pixel on the pixel grid.

16. The storage device of claim 13, wherein the receiving step comprises receiving an x-coordinate for a vertical guideline.

17. The storage device of claim 13, wherein the receiving step comprises receiving x-coordinates in a vertical pixel snapping guideline collection or y-coordinates in a horizontal pixel snapping guideline collection.

18. A method for snapping points of interest to a device-dependent pixel grid in anti-aliased rendering scenarios comprising the steps of:
providing a first application programming interface (API) for setting a collection of horizontal pixel snapping guidelines on a visual, wherein each horizontal pixel snapping guideline is defined by a coordinate of a device-independent coordinate system and is associated with an area of horizontal symmetry of at least a portion of the visual;
providing a second API for setting a collection of vertical pixel snapping guidelines on the visual, wherein each vertical pixel snapping guideline is defined by a coordinate of a device-independent coordinate system and is associated with an area of vertical symmetry of at least a portion of the visual;
calculating a horizontal offset required to snap each horizontal pixel snapping guideline to a nearest horizontal line in the pixel grid and storing each horizontal offset in association with its corresponding horizontal pixel snapping guideline;
calculating a vertical offset required to snap each vertical pixel snapping guideline to a nearest vertical line in the pixel grid and storing each vertical offset in association with its corresponding vertical pixel snapping guideline;
snapping a plurality of points of interest to the pixel grid by applying to each point an offset associated with a nearest horizontal pixel snapping guideline and an offset associated with a nearest vertical pixel snapping guideline.

19. The method of claim 18, wherein a rendering appearance is improved by snapping the plurality of points to the pixel grid.

20. A storage device having computer-executable instructions for causing a computer to perform the steps recited in claim 18.

* * * * *